C. W. BAKER AND F. F. RORABECK.
COUPLING.
APPLICATION FILED FEB. 21, 1919.
1,325,826. Patented Dec. 23, 1919.
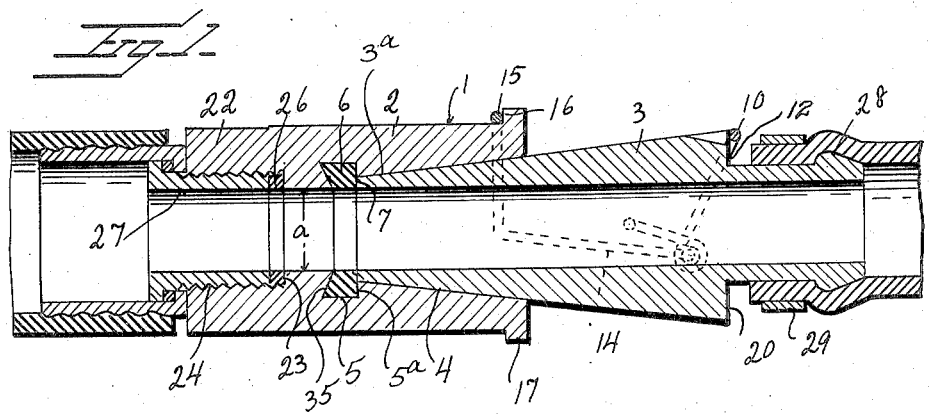
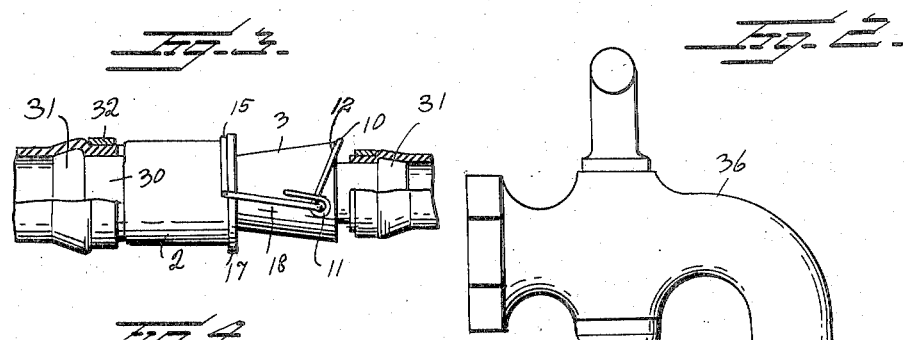
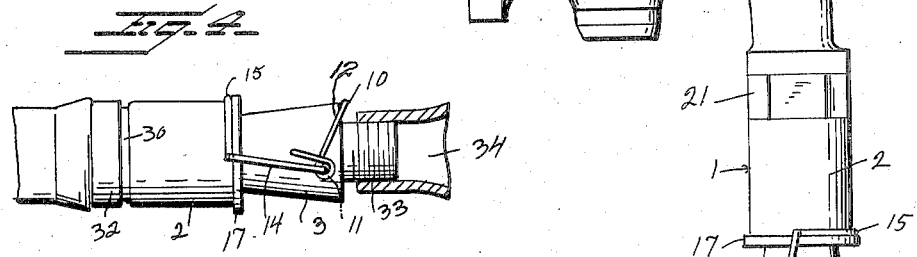
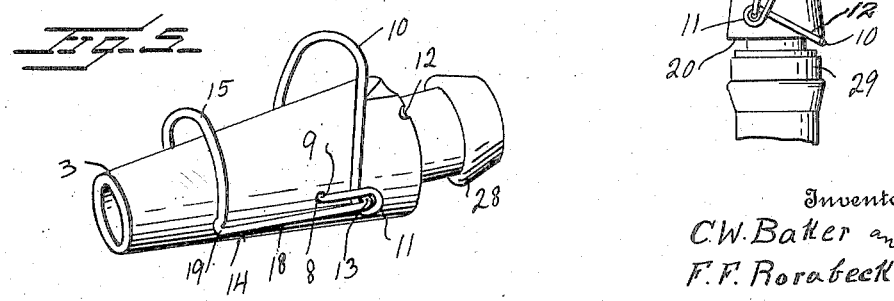
Inventors
C. W. Baker and
F. F. Rorabeck
By Watson E. Coleman
Attorney

UNITED STATES PATENT OFFICE.

CHARLES W. BAKER, OF WATTS, AND FLOYD F. RORABECK, OF AZUSA, CALIFORNIA.

COUPLING.

1,325,826.   Specification of Letters Patent.   Patented Dec. 23, 1919.

Application filed February 21, 1919. Serial No. 278,400.

*To all whom it may concern:*

Be it known that we, CHARLES W. BAKER and FLOYD F. RORABECK, citizens of the United States, residing at Watts and Azusa, respectively, in the county of Los Angeles and State of California, have invented certain new and useful Improvements in Couplings, of which the following is a specification, reference being had to the accompanying drawings.

This invention relates to an improved coupling and an object of the invention is the provision of a device of this kind for coupling together various lengths of hose, and for connecting hose to faucets or sprinklers.

A further object of the invention is to provide a device of this kind, which is simple and practical in construction, and which may be manufactured for a small cost and sold at a reasonable profit, and when used the connection between hose sections, or a connection of a hose to a faucet or sprinkler, may be effected expeditiously and rendered secure and water-tight.

A further object of the invention is to provide a coupling, which is efficient, and easily applied.

The invention further aims to provide a coupling of this kind, including coupling members, one of which has features which are common to have connections to the other members.

While the design and construction of the device at present illustrated is deemed preferable, it is obvious that the device is susceptible to alterations, when reducing the device to a practical form for commercial purposes. The right to these alterations is claimed, provided they are comprehended within the scope of what is claimed.

The invention comprises further features and combination of parts, hereinafter set forth, shown in the drawings and claimed.

In the drawings:

Figure 1 is a longitudinal sectional view through the improved coupling, constructed in accordance with the invention, and showing the same in use for coupling hose sections.

Fig. 2 is a side elevation of the coupling employed for connecting a hose to a conventional form of faucet.

Fig. 3 is a view of the coupling partly in elevation and partly in section, showing the coupling for connecting a pair of hose sections, the hose sections being connected to the coupling members in a little different manner than is shown in Fig. 1.

Fig. 4 is a view of the coupling partly in elevation and partly in section showing the coupling connecting a conventional form of sprinkler to a hose.

Fig. 5 is an enlarged detail perspective view of one of the members of the coupling, clearly illustrating the clamping device carried thereby.

Referring to the drawings, 1 designates a coupling as a whole, which consists of the two members 2 and 3. The interior structure of the coupling member 2 include features, which are common to the corresponding coupling members 2 in the other figures of the drawings. Therefore, the member 2 has its interior at one end thereof conical or tapered, as shown at 4. At the smaller end of the tapered interior of the member 2 an annular groove or channel 5 for the reception of a rubber washer or gasket 6. It is to be observed that the diameter of the smaller end of the tapered portion $3^a$ of the member 3 is larger than the diameter of the bore of the member 2 as indicated by the transverse line $a$ in Fig. 1. By reason of this construction a portion 7 of the gasket or washer 6 is exposed. The coupling member 3 is of a general tapered or conical shape, so as to substantially conform to the conical or tapered portion 4 of the member 2, and its smaller end is designed to have a wedging and close fit into the tapered part 4 of the coupling member 2, whereby the smaller end of the member 3 may contact with the exposed part 7 of the washer 6, thereby assuring a water-tight joint, when the two coupling members are united and clamped together as will be hereinafter set forth.

The coupling member 3 at diametrically opposite points in its wall is provided with bearings 8, in which the lateral ends 9 of the U-shaped lever 10 are mounted, thereby pivotally mounting the lever, as shown clearly in Figs. 1, 3 and 5. The arms of this U-shaped or loop lever are turned or coiled upon themselves to form fulcruming eyes 11. It is to be noted that the portions of the arms beyond the eyes extend at obtuse angles, whereby when the lever is closed and in engagement with the notches 12 of the coupling member 3, the eyes are disposed out of alinement with the bearings 8 of the lateral ends 9. Fulcrumed in the eyes 11 are the hook ends 13 of a second U-shaped or loop lever 14. The lever 14 has a laterally extending semi-circular curved arch portion 15, which bridges from one arm to the other of the lever 14. When the coupling members 2 and 3 are united the semi-circular lateral part 15 arches about the coupling member 2, in a position adjoining the shoulder 16 provided by the flange 17. When the lever 14 is disposed so that the semi-circular curved lateral part 15 engages the coupling member 2, the arms of the lever 14 are out of alinement with the bearings of the lateral portions of the lever 10, and since the portions 18 of the arms of the lever 14 have a tensioning action axially, since there is provided spring curved portions at 19, tension is urged upon the eyes 11, thereby holding the loop end of the lever 10 in engagement with the notches 12 of the coupling member 3. These notches 12 are formed on the marginal edge of the shoulder 20 of the coupling member 3. Owing to this urged tensioning action between the two levers, when they are disposed in the positions shown in Figs. 1 and 3, the coupling member 3 is drawn securely into the coupling member 2, the conical adjacent walls of the two coupling members coöperating, and the smaller end of the coupling member 3 closely engages the gasket or washer 6, thereby assuring a water-tight joint between the two coupling members.

In Figs. 1 and 2, the coupling member at one end has an octagonal portion 21, to be engaged by a wrench or other suitable tool for turning the coupling member home. On the interior of the end portion 22 of the coupling member 2 a shoulder 23 is formed, there being adjoining threads 24. Engaging the shoulder 23 is a washer or gasket 26, which is engaged by the conventional form of sleeve coupling 27, to insure a water-tight joint. The threads of the sleeve coupling 27 engage the threads 24. This sleeve coupling 27 is of general form or construction, and as a rule is carried by various hose sections.

In Figs. 1 and 2 the coupling member 3 at its end opposite the tapered part has an enlarged or bulged portion 28, over which the end of a hose section may be urged, and then clamped by a conventional form of clip as shown at 29. The same connection for the coupling member 2 and a hose section is shown in Fig. 3.

The coupling member 2 in Figs. 3 and 4 at its end opposite the shoulder 17 is provided with a reduced portion 30, which has an enlargement or bulged portion 31, over which an end of a hose section, may be urged, secured by a conventional form of clip 32. This connection is similar to the connection of a hose section to the coupling member 3 shown in Figs. 1 and 2.

In Fig. 4 the coupling member 3 at its end opposite the smaller end of the tapered portion thereof is provided with a reduced threaded extension 33, which may be screwed into a conventional form of threaded bore of a sprinkler 34, of general construction.

The groove 5 which receives the gasket or washer 6 has an inclined or beveled wall 35, to insure holding the washer or gasket in place. This washer is forced into the tapered portion 4 and allowed to be sprung into the groove or channel. In Fig. 2 a hose section is coupled to a faucet 36 of general construction, by means of the coupling device.

It is to be noted that in view of the formation of the groove or channel 5 of the coupling member 2 it is difficult to lose the washer or gasket 6. For instance, it is to be observed that the groove is under cut, and it has a wall $5^a$, acting to retain the gasket or washer in contact with the beveled walls 35. This construction of groove for the reception of the washer or gasket has been designed owing to the fact that washers used in the present day coupling have been lost, by dragging the hose around on the ground, and by the construction of this groove as now illustrated, it is the aim of the invention to secure against the loss of the washer.

The invention having been set forth, what is claimed as new and useful is:

The combination with male and female coupling members, the former being exteriorly tapered and the latter interiorly tapered to receive the former, of a washer countersunk on the interior wall of the latter adjacent the inner portion of its taper to be engaged by the smaller end of the male member so that a water tight joint is insured, the female member having an exterior flange at its open end, a lever comprising side arms arranged adjacent the male member and provided with a loop portion bent laterally and adapted to engage said external flange, a second lever, of a U-form construction having its arms bent to form eyes constituting bearings in which the ends of the arms of the first lever are linked so that the two levers may pivotally flex relatively to each other, the arms of the second lever beyond the bearing eyes being extended at right angles to the major portions of said arms and substantially in parallelism with the male member and having lateral parts penetrating into diametrically opposite portions of the male member, thereby pivotally mounting the second lever, whereby upon moving the second lever so that its arched portion may engage the male member, the bearing eyes will become disposed laterally out of alinement with the pivots of the second lever and the point where the lateral loop of the first lever extends from its arms, thereby holding the first lever in secure engagement with the flange of the female member, the male member having a notch to be engaged by the arch of the second lever.

In testimony whereof we hereunto affix our signatures in the presence of two witnesses.

CHARLES W. BAKER.
FLOYD F. RORABECK.

Witnesses:
M. RENA SMITH,
VERA MERSHON.